G. BEISNER.
Church.
No. 83,595.
Patented Nov. 3, 1868.
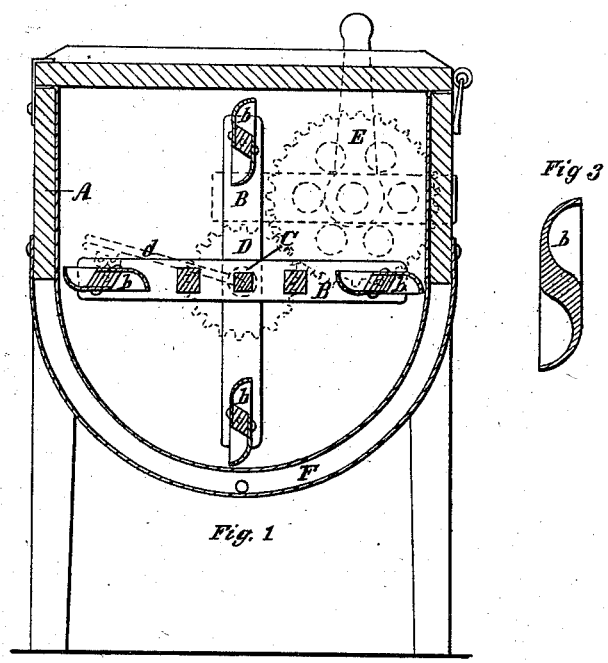
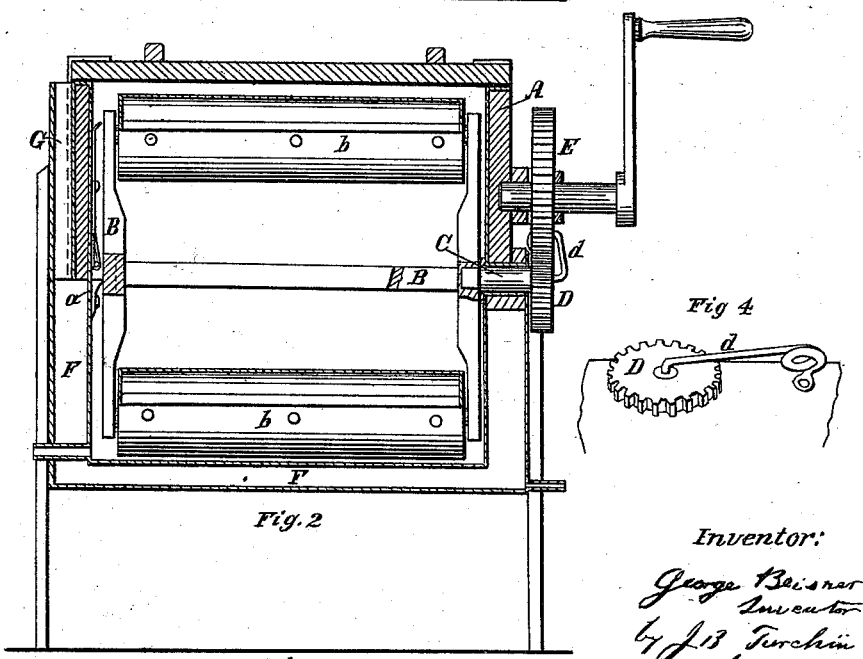

GEORGE BEISNER, OF CHICAGO, ILLINOIS.

*Letters Patent No. 83,595, dated November 3, 1868.*

IMPROVEMENT IN CHURNS.

The Schedule referred to in these Letters Patent and making part of the same.

*To all whom it may concern:*

Be it known that I, GEORGE BEISNER, of the city of Chicago, in the county of Cook, and State of Illinois, have invented certain new and useful Improvements in "Churns;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is a cross-section, and
Figure 2 is a longitudinal section of the machine.
Figure 3 represents the paddle, and
Figure 4, the spring $d$.

The nature of my invention consists in providing the beater with movable paddles, in the shape of troughs, for the purpose of producing a great agitation in the cream; also, in the arrangement of the chamber connected with the machine, and serving as cooler or heater, according to the temperature required; also, in the arrangement of the working-gear of the machine.

A is a box, with semicircular bottom, in which box a spider-beater, B, is hung, resting with one end on the casting $a$, and supported at the other end by the shaft C of the pinion D, gearing into the cog-wheel E, worked by a crank-handle, the pinion D being retained in place by spring $d$, arranged as represented on fig. 4.

The beater is provided with paddles, $b\ b$, arranged in the shape of double troughs, as represented on fig. 3, which paddles may be made of wood and sheet-metal combined, or may be cast of one piece, and are for the purpose of thoroughly agitating the cream or milk to be churned, and of facilitating the rolling of the butter.

F is a chamber formed between the two bottoms of the box, and provided with a flue, G, through which it is filled with cold or hot water, thus serving as cooler or heater, according to circumstances.

The churn and chamber are provided with suitable faucets to discharge buttermilk and water.

The machine is operated in the usual manner, and when the churning is done, the spring $d$ is moved aside, the pinion D is taken out, and the spider, thus disengaged, is taken out of the box, and the butter is collected.

What I claim as new, and desire to secure by Letters Patent, is—

1. The movable paddles $b\ b$, arranged and operating substantially as set forth.

2. The spring $d$, as and for the purpose set forth.

Witnesses:  GEORGE BEISNER.
J. B. TURCHIN,
H. CONSBRUCH.